(12) United States Patent
Fischer et al.

(10) Patent No.: US 11,458,837 B2
(45) Date of Patent: Oct. 4, 2022

(54) DRIVE TRAIN FOR AN AGRICULTURAL MACHINE

(71) Applicant: ZF Friedrichshafen AG, Friedrichshafen (DE)

(72) Inventors: Walter Fischer, Friedrichshafen (DE); Jürgen Pohlenz, Ravensburg (DE); Jan Baudis, Oberteuringen (DE); Christian Herrmann, Hergensweiler (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 225 days.

(21) Appl. No.: 16/782,351

(22) Filed: Feb. 5, 2020

(65) Prior Publication Data

US 2020/0331345 A1    Oct. 22, 2020

(30) Foreign Application Priority Data

Mar. 8, 2019   (DE) .................... 10 2019 203 213.3

(51) Int. Cl.
| | | |
|---|---|---|
| *B60K 25/06* | (2006.01) | |
| *B60K 17/04* | (2006.01) | |
| *B60K 17/24* | (2006.01) | |
| *F16H 37/06* | (2006.01) | |
| *F16H 47/04* | (2006.01) | |
| *B60K 17/344* | (2006.01) | |

(52) U.S. Cl.
CPC ............. *B60K 25/06* (2013.01); *B60K 17/04* (2013.01); *B60K 17/24* (2013.01); *F16H 37/065* (2013.01); *F16H 47/04* (2013.01); *B60K 17/344* (2013.01); *F16H 2702/00* (2013.01); *F16H 2702/02* (2013.01)

(58) Field of Classification Search
None
See application file for complete search history.

(56) References Cited

U.S. PATENT DOCUMENTS 11,077,746 B2 * 8/2021 Rechenbach .......... H02K 7/108

FOREIGN PATENT DOCUMENTS

| DE | 102016223495 A1 * | 5/2018 | |
|---|---|---|---|
| DE | 10 2017 200 240 A1 | 7/2018 | |
| DE | 102019219356 A1 * | 6/2021 | |
| DE | 102020201692 B3 * | 7/2021 | |
| DE | 102020201778 A1 * | 8/2021 | |
| DE | 102020202008 A1 * | 8/2021 | |
| WO | WO-2021185643 A1 * | 9/2021 | ............. F16H 3/728 |

OTHER PUBLICATIONS

Hytrac GmbH: Power split CVT gear, 2013. URL: https://www.hytrac.com/products/power-split-cvt-gear/.
German Official Action corresponding to 10 2019 203 213.3 dated Nov. 11, 2019.

* cited by examiner

*Primary Examiner* — Faye M Fleming
(74) *Attorney, Agent, or Firm* — Finch & Maloney PLLC; Jay S. Franklin; Michael J. Bujold

(57) ABSTRACT

A drive-train of an agricultural machine, such as a tractor, has a power-split transmission (1) and a separate transfer case (2). The transfer case (2) can be connected to a drive motor and the gear ratio of the transfer case (2) can be adapted in such manner that the power-split transmission (1) can be used for various drive powers.

11 Claims, 1 Drawing Sheet

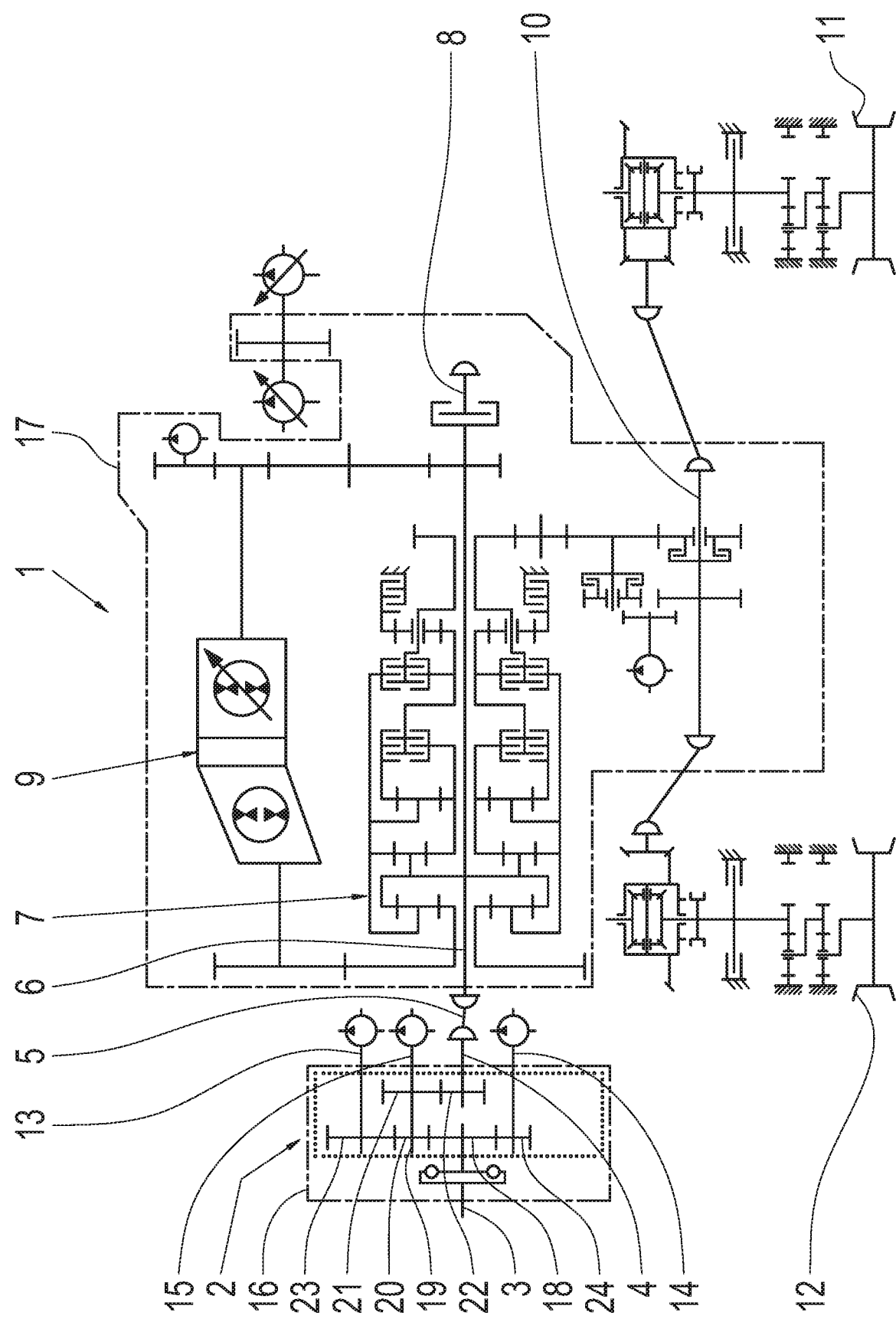

DRIVE TRAIN FOR AN AGRICULTURAL MACHINE

This application claims priority from German patent application serial no. 10 2019 203 213.3 filed Mar. 8, 2019.

FIELD OF THE INVENTION

The invention relates to a drive-train for an agricultural machine.

BACKGROUND OF THE INVENTION

Drive-trains of this type for an agricultural machine have a power-split transmission with a continuously variable power branch and a mechanical power branch, which are summed by summation gearing to transmit drive power from a drive motor, for example an internal combustion engine, to the drive wheels.

DE 10 2017 200 240 A1 discloses a drive-train for an agricultural machine, in which a power-split transmission can be driven by a drive motor and which drives the wheels of the vehicle. The summation gearing is in the form of a planetary gearset and the input shaft into the power-split transmission passes completely through the summation gearing.

SUMMARY OF THE INVENTION

The purpose of the present invention is to develop further a drive-train of this type for an agricultural machine.

This objective is achieved by a drive-train of the type concerned, which incorporates the characterizing features of the principal claim.

According to the invention, between a power-split transmission and the drive motor, which can for example be an internal combustion engine, a transfer case is arranged, whose output shaft drives the input shaft of the power-split transmission. The transfer case has a step-down ratio such that the rotational speed of the input shaft of the transfer case is lower than the rotational speed of the output shaft of the transfer case. This makes it possible for already existing power-split transmissions designed for a particular engine power to be used also in vehicles with higher engine power. That is because the transfer case has a "fast" gear ratio, for example with i=0.86, whereby, when using hydrostats in the continuously variable power branch, the pressure falls again into the permissible range. Without this transfer case the pressure in the hydrostats would increase to above the permissible range, for example to 600 bar.

By using the separate transfer case, already existing hydrostatic-mechanical power-split transmissions can be used in vehicles of various power categories, without having to carry out expensive modifications to the power-split transmission. Only the gear ratio of the transfer case has to be adapted.

In a further embodiment of the invention the transfer case has at least one auxiliary power take-off onto which a hydraulic pump can be fitted. The gear ratio of the input shaft to this auxiliary power take-off shaft is preferably i=1, so that the rotational speed of the input shaft is equal to the rotational speed of the auxiliary power take-off shaft of the hydraulic pump. Likewise it is possible to fit not just one auxiliary power take-off, but more than one power take-off on the transfer case.

In a further embodiment of the invention, the transfer case is in the form of a spur gear system. This makes it possible on the one hand to vary the gear ratio of the input shaft of the transfer case to the output shaft of the transfer case, and at the same time to make the gear ratio of the input shaft of the transfer case to the auxiliary power take-off shaft of the pumps of the transfer case equal, i.e. i=1. Thus, without changing the gear ratio of the input shaft to the auxiliary power take-off shaft of the transfer case, different transfer cases with different gear ratios of the input shaft to the output shaft of the transfer case can be formed in a simple manner.

In a further embodiment of the invention, the transfer case has a completely independent housing which accommodates the input shaft and the output shaft of the transfer case, wherein the input shaft of the transfer case can be connected to a drive motor and the output shaft of the transfer case can either be connected to the input shaft of the power-split transmission directly, or connected to the input shaft of the power-split transmission by way of a cardan shaft. It is also possible for the housing of the transfer case to partially enclose the input shaft and the output shaft, and for the transfer case to be connected to or suspended from the power-split transmission.

Thus, it is possible for the transfer case to be suspended from the power-split transmission or for the transfer case and the power-split transmission to be suspended together in a frame. Since the transfer case is made separately, the power-split transmission can remain unchanged and flexibility is provided by modifying the transfer case.

Further characteristics emerge from the description of the FIGURE.

BRIEF DESCRIPTION OF THE DRAWINGS

The sole FIGURE shows a drive-train consisting of a power-split transmission and transfer box.

DETAILED DESCRIPTION OF THE PREFERRED EMBODIMENTS

The single FIGURE shows the drive-train consisting of a power-split transmission 1 and a transfer case 2. The drive input shaft 3 of the transfer case can be connected to a drive engine (not shown) such as an internal combustion engine or an electric motor. The drive output shaft 4 of the transfer case 2 is connected by way of a cardan shaft 5 to the input shaft 6 of the power-split transmission. The input shaft 6 passes completely through the summation gearing 7 and forms an auxiliary power take-off 8 at the opposite end of the power-split transmission 1, for example for a power-take-off shaft. The continuously variable power branch 9 has either two hydraulic machines or two electric machines. The drive output shaft 10 of the power-split transmission 1 drives wheels 11 of a rear axle and wheels 12 of a front axle. The transfer case has an auxiliary power take-off 13, an auxiliary power take-off 14 and an auxiliary power take-off 15, by means of which hydraulic pumps can be driven. The housing 16 is designed such that the transfer case 2 can be made separately from the housing 17 of the power-split transmission 1. In this context separately means that the power-split transmission 1 only has to be changed in minor respects and can mainly be kept the same, whereas the transfer case 2 can be adapted specially for the vehicle concerned. Thus, the transfer case 2 has a housing 16 which surrounds the transfer case 2 at least partially. That makes it possible either to suspend the transfer case 2 on the power-split transmission 1, i.e. to connect it thereto for example by bolting it on, or to suspend the transfer case 2 independently in a vehicle frame.

The drive output shaft 4 has to be designed in accordance with the design of the transfer case 2. It is also possible for the drive output shaft 4 and the input shaft 6 to be made integrally.

The transfer case 2 is in the form of a spur gear system, wherein the gear ratios between the input shaft 3 and the auxiliary power take-offs 13, 14 and 15 are designed such that equivalent rotational speeds are produced. In this context equivalent rotational speeds means that the rotational speeds are almost equal. This is achieved for example by a gear ratio i=1. The gear ratio between the drive input shaft 3 and the drive output shaft 4, however, is made such that the rotational speed of the drive output shaft 4 is higher than the rotational speed of the drive input shaft 3. To achieve all this, the transfer case 2 has a spur gear 18 which is connected rotationally fixed to the drive input shaft 3. On the countershaft 19 are held spur gears 20 and 21, of which the spur gear 20 is functionally connected to the spur gear 18 and the spur gear 21 is functionally connected to a spur gear 22, wherein the spur gear 22 is connected rotationally fixed to the drive output shaft 4. The spur gear 20 co-operates with the spur gear 23, which is connected rotationally fixed to the auxiliary power take-off 13. The spur gear 24 co-operates with the spur gear 18, whereby the spur gear 24 is connected rotationally fixed to the auxiliary power take-off 14. The countershaft 19 is connected rotationally fixed to the auxiliary power take-off 15.

INDEXES

1 Power-split transmission
2 Transfer case
3 Drive input shaft
4 Drive output shaft
5 Cardan shaft
6 Input shaft
7 Summation gearing
8 Auxiliary power take-off
9 Power branch
10 Drive output shaft
11 Wheels
12 Wheels
13 Auxiliary power take-off
14 Auxiliary power take-off
15 Auxiliary power take-off
16 Housing
17 Housing
18 Spur gear
19 Countershaft
20 Spur gear
21 Spur gear
22 Spur gear
23 Spur gear
24 Spur gear

The invention claimed is:

1. A drive-train for an agricultural machine comprising:
a power-split transmission having an input shaft which is connectable to a drive motor,
the power-split transmission comprising summation gearing which is in a form of a planetary gearset,
the input shaft of the power-split transmission passing through the summation gearing,
a separate transfer case having a drive input shaft and a drive output shaft,
the drive input shaft of the transfer case being connectable to the drive motor and the drive output shaft being connected to the input shaft of the power-split transmission, and
the transfer case having step-down gearing such that a rotational speed of the drive input shaft of the transfer case is lower than a rotational speed of the drive output shaft.

2. The drive-train according to claim 1, wherein the transfer case has at least one further shaft for an auxiliary power take-off for driving a pump, and a rotational speed of the at least one further shaft is equal to the rotational speed of the drive input shaft of the transfer case.

3. The drive-train according to claim 1, wherein the input shaft of the power-split transmission, passing through the summation gearing, drives an auxiliary power take-off.

4. The drive-train according to claim 1, wherein the transfer case is connected to the power-split transmission.

5. The drive-train according to claim 1, wherein the transfer case is fixed to a vehicle frame together with the power-split transmission.

6. The drive-train according to claim 1, wherein the transfer case is in a form of a spur gear system in which the drive input shaft, of the transfer case, and the drive output shaft are arranged coaxially.

7. The drive-train according to claim 1, wherein the transfer case has three auxiliary power take-offs.

8. The drive-train according to claim 1, wherein a cardan shaft connects the drive output shaft of the transfer case to the input shaft of the power-split transmission.

9. The drive-train according to claim 1, wherein the drive output shaft of the transfer case is directly connected to the input shaft of the power-split transmission and is made integrally therewith.

10. The drive-train according to claim 1, wherein a continuously variable power branch of the power-split transmission comprises hydraulic units configured as axial pistons.

11. A drive-train for an agricultural machine, the drive train comprising:
a power-split transmission having an input shaft and comprising summation gearing which is in a form of a planetary gearset, and the input shaft passes through the summation gearing; and
a transfer case being separated from the power-split transmission, the transfer case having a drive input shaft and a drive output shaft, the drive input shaft of the transfer case being connectable to a drive motor and the drive output shaft of the transfer case being connected to the input shaft of the power-split transmission, and the transfer case having step-down gearing such that, during operation, a rotational speed of the drive input shaft of the transfer case is lower than a rotational speed of the drive output shaft of the transfer case.

* * * * *